United States Patent [19]
Kaiyama et al.

[11] Patent Number: 5,615,210
[45] Date of Patent: Mar. 25, 1997

[54] MOBILE RADIO COMMUNICATIONS SYSTEM

[75] Inventors: Akira Kaiyama, Kanagawa; Noriteru Shinagawa, Ibaragi; Masatomo Nakano, Saitama, all of Japan

[73] Assignee: NTT Mobile Communications Network Inc., Tokyo, Japan

[21] Appl. No.: 371,547

[22] Filed: Jan. 11, 1995

[30] Foreign Application Priority Data

Jan. 11, 1994 [JP] Japan ................................. 6-001368

[51] Int. Cl.$^6$ .............................. H04L 12/56; H04Q 7/22
[52] U.S. Cl. ............................................ 370/389; 370/474
[58] Field of Search ......................... 370/60, 60.1, 61, 370/94.1, 94.2, 95.1, 99

[56] References Cited

U.S. PATENT DOCUMENTS 5,425,031  6/1995  Otsuka ..................... 370/95.1

Primary Examiner—Melvin Marcelo
Attorney, Agent, or Firm—Cushman, Darby & Cushman IP Group of Pillsbury Madison & Sutro LLP

[57] ABSTRACT

Transmission quality and throughput are improved when communication is carried out using fixed-length packets in wire circuits between radio base stations and a mobile switching center in mobile radio communications systems. Low bit-rate digital information signals are converted to short packets by a plurality of information data assembly/disassembly circuits provided in parallel. A plurality of these short packets are transmitted after being inserted into a long fixed-length packet by means of a fixed-length packet assembly/disassembly circuit, and a plurality of short packets are extracted from the fixed-length packet and then restored to the low bit-rate digital information signals by information data assembly/disassembly circuits. This enables high throughput, economical communication paths to be constructed.

8 Claims, 10 Drawing Sheets

(b)

MOBILE RADIO COMMUNICATIONS SYSTEM

This application bases its priority on Japanese Application 6/001368, filed Jan. 11, 1994, which is hereby incorporated herein by reference.

FIELD OF THE INVENTION

This invention relates to communications between a mobile switching center and radio base stations in mobile radio communications systems. More particularly, this invention relates to increasing transmission quality and throughput in communications wherein both low-speed and high-speed packets are involved. This invention is suitable for use in communications systems involving master stations and slave stations.

BACKGROUND OF THE INVENTION

The overall constitution of a mobile radio communications system will be explained with reference to FIG. 9, which shows the overall constitution of both this invention and the prior art. In a mobile radio communications system, mobile stations $100_1$–$100_4$ and radio base stations $101_1$–$101_k$ are connected by radio channels, and radio base stations $101_1$–$101_k$ and mobile switching center 107 are connected by wire circuits $106_1$–$106_k$. Radio base stations $101_1$–$101_k$ and mobile switching center 107 communicate via wire circuits $106_1$–$106_k$ by means of fixed-length packets.

Asynchronous Transfer Mode (ATM) is a communications technique which uses fixed-length packets and which is being considered for use in fixed networks. The constitution or make-up of the signals used in ATM transmission systems will be explained with reference to FIGS. 10(a) and 10(b), which shows the constitution of such signals. There are two methods for making low bit-rate signals into cells in an ATM transmission system. In the first method, as shown in FIG. 10(a), data is accumulated until it fills one cell. In the second method, as shown in FIG. 10(b), an ATM cell is formed by accumulating data in a cell during an allowable cell-creation delay time, up to which time the quality of the information signal will not deteriorate due to the delay involved in making the cell. Thereafter, the portion of the cell length that is not filled is left empty of data and is filled with dummy data.

Suppose that the method illustrated in FIG. 10(a) is applied to ATM transmission in a fixed network in which data is transmitted by fixed-length packets. If information signals are transmitted at 64 kbps, then because the delay time involved in making a cell is only 6 ms, there is little deterioration in signal quality.

However, in mobile radio communications systems, given the need to make effective use of frequency resources in the radio section, information signals are converted to low bit-rate signals using data compression techniques. If it is assumed that the coded and compressed information signals in a mobile radio communications system are 8 kbps signals, then, if an ATM cell is completely filled with such signals, the delay time involved in making a cell will be 48 ms.

Deterioration of signal quality due to echoes and the like can no longer be ignored when delay time increases in this way. Now, on the assumption that information signals in a mobile communications network are, as previously described, 8 kbps signals, and that the intention is to make cells with the same cell-creation delay time as the 64 kbps information signals that are transmitted for example in a fixed network, then the amount of information held in a cell will be 8000×0.006=48, i.e., 48 bits or 6 bytes. Because a 48-byte data section is provided in a single ATM cell, the utilization efficiency of the data section under these circumstances will be only 12.5%, which is very low (see FIG. 10(b)), and the end result is a low throughput network. The shortcoming of this system is that the poor information throughput in the network means that it is difficult to construct an economical mobile communications network.

The present invention has been devised against this background, and it provides an economical mobile radio communications system which avoids deterioration in information signal quality and makes effective use of transmission lines.

SUMMARY OF THE INVENTION

This invention is a mobile radio communications system which has radio base stations that are connected to mobile stations by radio channels, and a mobile switching center which is connected to these radio base stations by wire circuits, and wherein this mobile switching center and the radio base stations have means which transmit and receive fixed-length packets through these wire circuits.

The transmitting and receiving means have (i) a plurality of means to which are input low bit-rate digital information signals that have been low bit-rate encoded by techniques such as adaptive differential pulse code modulation, adaptive predictive coding, adaptive transform coding, and adaptive predictive coding with adaptive bit-allocation, and which assemble short packets; and (ii) a plurality of means to which short packets are input, and which disassemble these into low bit-rate digital information signals; where the plurality of means (i) and (ii) are respectively provided in parallel in correspondence with the information signal channels.

The fixed-length packets have a signal length which accommodates a plurality of these short packets.

The transmitting and receiving means also have (iii) means which accommodate the short packets that are output from the assembling means in the fixed-length packets in positions corresponding to the channels, and which transmit these to the wire circuits; and (iv) means which extract and disassemble the packets accommodated in channel-corresponding positions in the fixed-length packets which arrive from these wire circuits, and which transfer them to channels corresponding to the positions in which they were accommodated.

The device corresponding to the transmitting and receiving means on the mobile switching center side can also comprise a first fixed-length packet switch (108) which is provided between the wire circuits (106) and the fixed-length packet assembly/disassembly circuits (114); and a second fixed-length packet switch (133) which is provided between these fixed-length packet assembly/disassembly circuits (114) and the information data assembly/disassembly circuits (113). The device corresponding to the transmitting and receiving means on the radio base station side can also comprise a third fixed-length packet switch (105) which is provided between the fixed-length packet assembly/disassembly circuit (104) that is connected to a wire circuit (106), and the information data assembly/disassembly circuits (103).

The transmitting means can also comprise a timer (311); means which forms the fixed-length packets at time intervals preset in this timer; and means which, when the preset time interval has elapsed and there is spare capacity in the fixed-length packet, inserts dummy packets into the empty portion of the fixed-length packet.

There may also be means which discriminates the type of data contained in the short packets, and means which changes the preset time of the timer in accordance with the type of data that has been discriminated by this means.

The types of data are voice data and non-voice data, and it is desirable to have a short preset time for voice data.

The timer can also comprise means which changes the preset time by means of an external signal.

The short packets may comprise a control part and a data part, but it is also feasible for a plurality of data parts to share a single control part.

In a mobile radio communications system, the mobile switching center and the radio base stations are connected by wire circuits. If the low-speed packets that are used in the radio channels are transmitted in these wire circuits at an unaltered bit rate, the section of a packet stuffed with dummy information as a result of the difference in signal length will be larger than the data section, and so throughput decreases. It follows that efficient communications can be achieved by accommodating a plurality of the low-speed packets used in mobile radio communications systems in the high-speed packets used in wire communications systems.

However, if low-speed packets are assembled one at a time and accommodated successively in time series fashion in a high-speed packet, the assembly of the high-speed packet takes too long and signal deterioration due to echoes and the like occurs. Accordingly, by assembling a plurality of low-speed packets in parallel and accommodating them simultaneously in a high-speed packet, it is possible to accommodate a plurality of low-speed packets in a high-speed packet in the space of a short assembly time.

Conversely, the original signal can be recovered by extracting, simultaneously and in parallel, a plurality of low-speed packets from a high-speed packet which has been assembled in this way. This enables efficient communications to be carried out, with a plurality of low-speed packets accommodated in a high-speed packet.

In other words, when implementing a mobile radio communications system using fixed-length packets as in ATM transmission, it is possible to avoid deterioration of signal quality during packetizing and to make effective use of transmission lines by (i) shortening the delay that occurs when low bit-rate signals are made into packets when a connection is established between the mobile switching center and a radio base station; and (ii) sending these packets between the mobile switching center and the radio base station after placing a plurality of them in a fixed-length packet. These measures enable an economical mobile radio communications system to be achieved.

The present invention facilitates high-quality communications by providing a plurality of information data assembly/disassembly circuits in parallel, and using these to convert low bit-rate information signals, which have been converted in code conversion circuits, to packets which are made within an allowable delay time as regards quality deterioration. This invention is designed to realize a high throughput, economical mobile radio communications system by transmitting these packets after a fixed-length packet assembly/disassembly circuit has been used to put a plurality of them into a fixed-length packet. The plurality of packets can then be extracted from the fixed-length packet and the information signal recovered by means of information data assembly/disassembly circuits.

It is also possible to provide a limiting time for the assembly time of the fixed-length packets, and to ensure that a preset maximum delay time is not exceeded. In this case, it is desirable for the limiting time to be variable in accordance with the type of data. For example, in the case of voice or other data where real-time transmission is required, the delay has to be made comparatively small, and therefore a short limiting time is set. On the other hand, in the case of data where a somewhat larger delay is acceptable, priority is given to throughput and a longer limiting time is set.

As explained above, this invention eliminates signal quality deterioration due to packetizing delay. Moreover, by transmitting information signals in the form of a fixed-length packet filled with a plurality of the signals, this invention provides a high throughput, economical mobile radio communications system.

By having a time-monitoring timer the setting of which can be varied, the optimum packetizing delay for a given type of call can be obtained, and high throughput can be achieved without exceeding the allowable delay.

DETAILED DESCRIPTION OF THE PRESENTLY PREFERRED EMBODIMENTS

First embodiment

Figure 9:
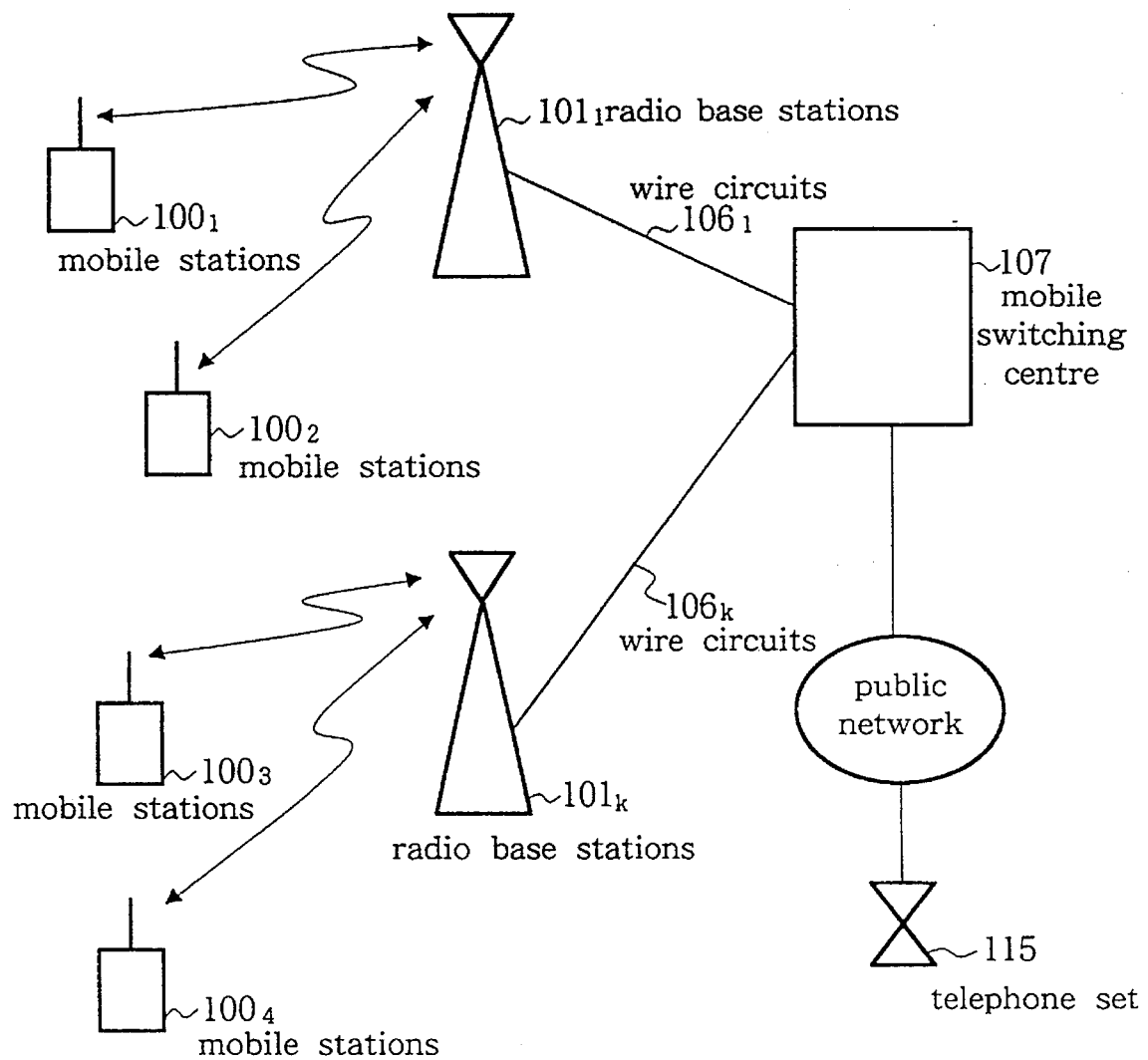
FIG. 9 shows the overall constitution of both this invention and the prior art.

A first embodiment of this invention will be explained with reference to FIG. 1, which is a block diagram of a device according to this first embodiment. Refer to FIG. 9 for the overall constitution of this invention.

This invention is a mobile radio communications system which has radio base station $101_1$ connected to mobile stations $100_1$ and $100_2$ by radio channels, and mobile switching center 107 connected to this radio base station $101_1$ by wire circuit $106_1$, wherein this mobile switching center 107 and radio base station $101_1$ have packet input/output parts 109 and $190_1$–$190_m$ which serve as means for transmitting and receiving fixed-length packets 200 through this wire circuit $106_1$.

Packet input/output parts 109 and $190_1$–$190_m$ respectively have (i) means to which are input 8 kbps low bit-rate digital information signals, and which assemble short packets, (ii) means to which short packets are input and which disassemble these into low bit-rate digital information signals; the means (i) and (ii) being provided in information data assembly/disassembly circuits $113_1$–$113_n$ and $103_1$–$103_n$, a plurality of which are provided in parallel and in correspondence to the channels of the information signals. Fixed-length packets 200 are 64 kbps signals which accommodate a plurality of these short packets. Packet input/output parts 109 and $190_1$–$190_m$ have, in fixed-length packet assembly/disassembly circuits $114_1$–$114_m$, and $104_1$–$104_m$, (i) means which accommodate the short packets, which are output from the assembling means of information data assembly/disassembly circuits $113_1$–$113_n$ and $103_1$–$103_n$, in fixed-length packet 200 in positions corresponding to the channels, and which transmit to wire circuit $106_1$; and (ii) means which extract and disassemble the packets accommodated in channel-corresponding positions in fixed-length packets 200 which arrive from this wire circuit $106_1$, and which transfer them to information data assembly/disassembly circuits $113_1$–$113_n$ and $103_1$–$103_n$ of channels corresponding to the positions in which they were accommodated.

The operation of this first embodiment of the invention will now be explained, and it will be assumed that mobile station $100_1$ is moving in a radio zone controlled by radio base station $101_1$. If controller 110 of mobile switching center 107 detects a call from telephone set 115 to mobile station $100_1$, it issues a general call and discovers that mobile station $100_1$ is in the radio zone of radio base station $101_1$. This is the same as in a conventional system.

The position of information signals within fixed-length packets 200 and the position of information data assembly/disassembly circuits 103 and 113 connected to fixed-length packet assembly/disassembly circuits 104 and 114, are assumed to be in a fixed, one-to-one correspondence. For example, when a communication path has been established between fixed-length packet assembly/disassembly circuit $104_1$ in radio base station $101_1$ and fixed-length packet assembly/disassembly circuit $114_1$ in mobile switching center 107, it is assumed that information signal $203_1$ corresponds to information data assembly/disassembly circuits $103_1$ and $113_1$, that information signal $203_2$ corresponds to information data assembly/disassembly circuits $103_2$ and $113_2$, and that information signal $203_n$ corresponds to information data assembly/disassembly circuits $103_n$ and $113_n$.

Figure 2A:
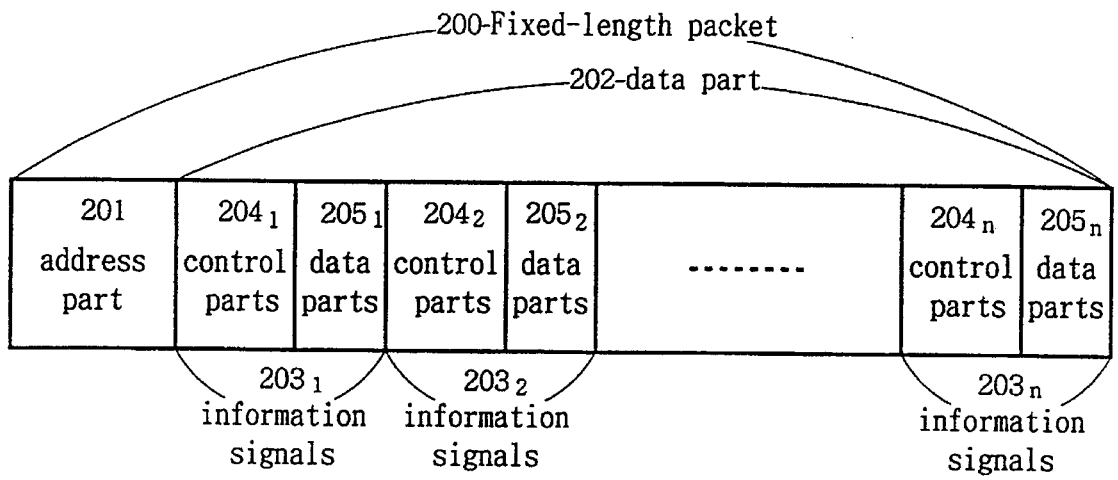
FIGS. 2(a) and 2(b) shows the constitution of the fixed-length packets.
Figure 2B:
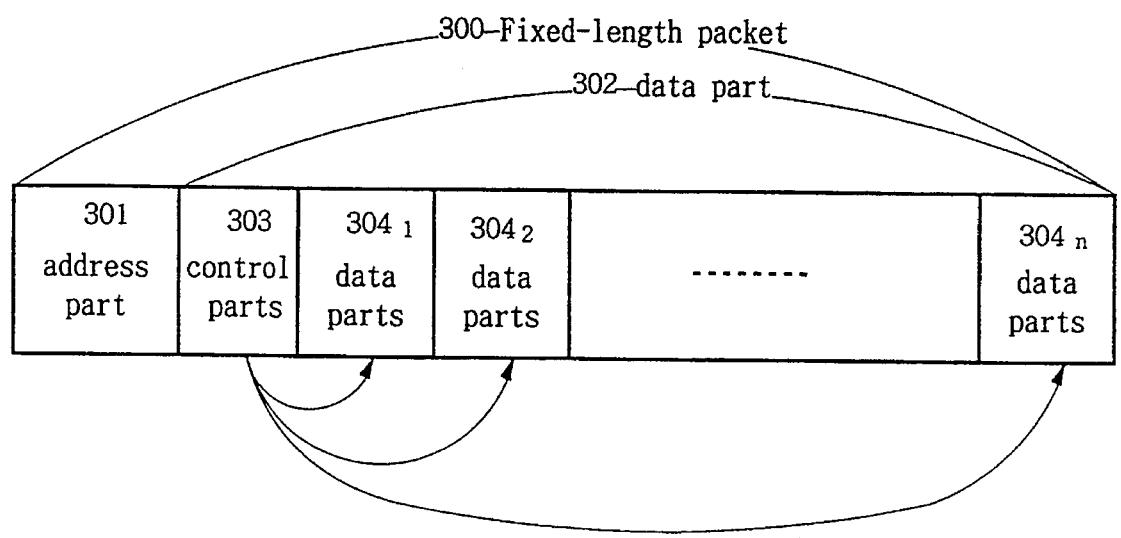
Figure 3:
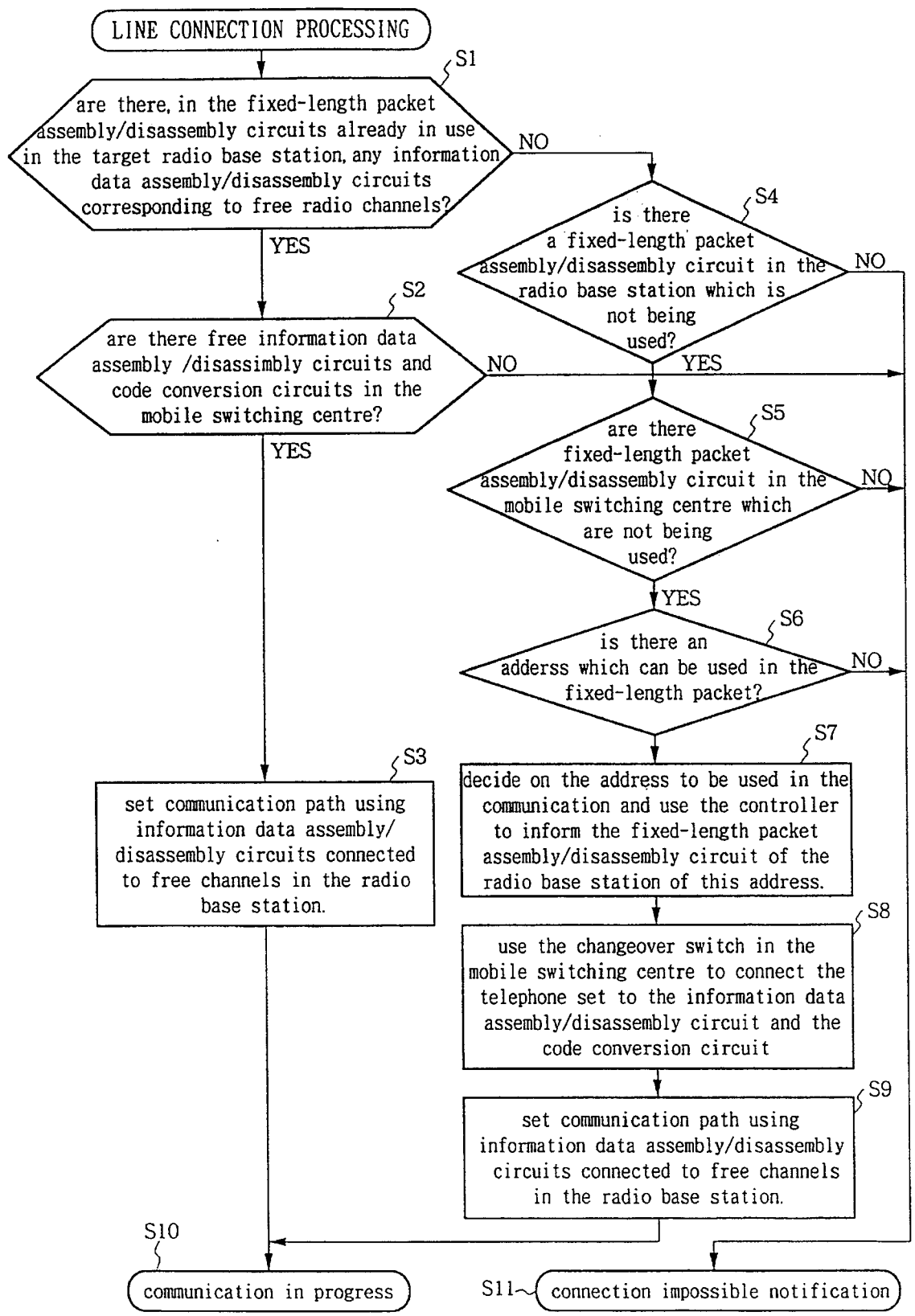
FIG. 3 is a flowchart of the line connection processing.

The operation of controller 110 will now be explained with reference to FIGS. 2(a), 2(b) and 3. FIGS. 2(a) and 2(b) shows the constitution of fixed-length packets, while FIG. 3 is a flowchart of the line connection processing. When controller 110 of mobile switching center 107 has discovered that mobile station $100_1$ is in the radio zone of radio base station $101_1$, it looks at fixed-length packet assembly/disassembly circuits 104 which are already being used in other communications, and checks to see whether or not there are, among the radio channels paired with information data assembly/disassembly circuits 103 connected to these circuits 104, radio channels that are not being used in other communications (S1).

If no radio channels meeting these conditions are discovered, controller 110 checks to see whether or not there is a fixed-length packet assembly/disassembly circuit $104_1$–$104_m$, within radio base station $101_1$ which is not being used (S4).

If no fixed-length packet assembly/disassembly circuit 104 within radio base station $101_1$ is discovered which meets this condition, all the radio channels are busy and therefore no communication path can be established. As a result, a busy tone or the like is used to notify telephone set 115 that connection is impossible (S11).

If a fixed-length packet assembly/disassembly circuit 104 within radio base station $101_1$ is discovered which meets the condition, controller 110 searches for fixed-length packet assembly/disassembly circuits $114_1$–$114_m$ in mobile switching center 107 which are not being used in other communications (S5). If no fixed-length packet assembly/disassembly circuit $114_1$–$114_m$ which is not being used in other communications is found, all the fixed-length packet assembly/disassembly circuits $114_1$–$114_m$, within mobile switching center 107 are busy with other communications, and therefore no communication path can be set. As a result, a busy tone or the like is used to notify telephone set 115 that connection is impossible (S11).

Figure 1:
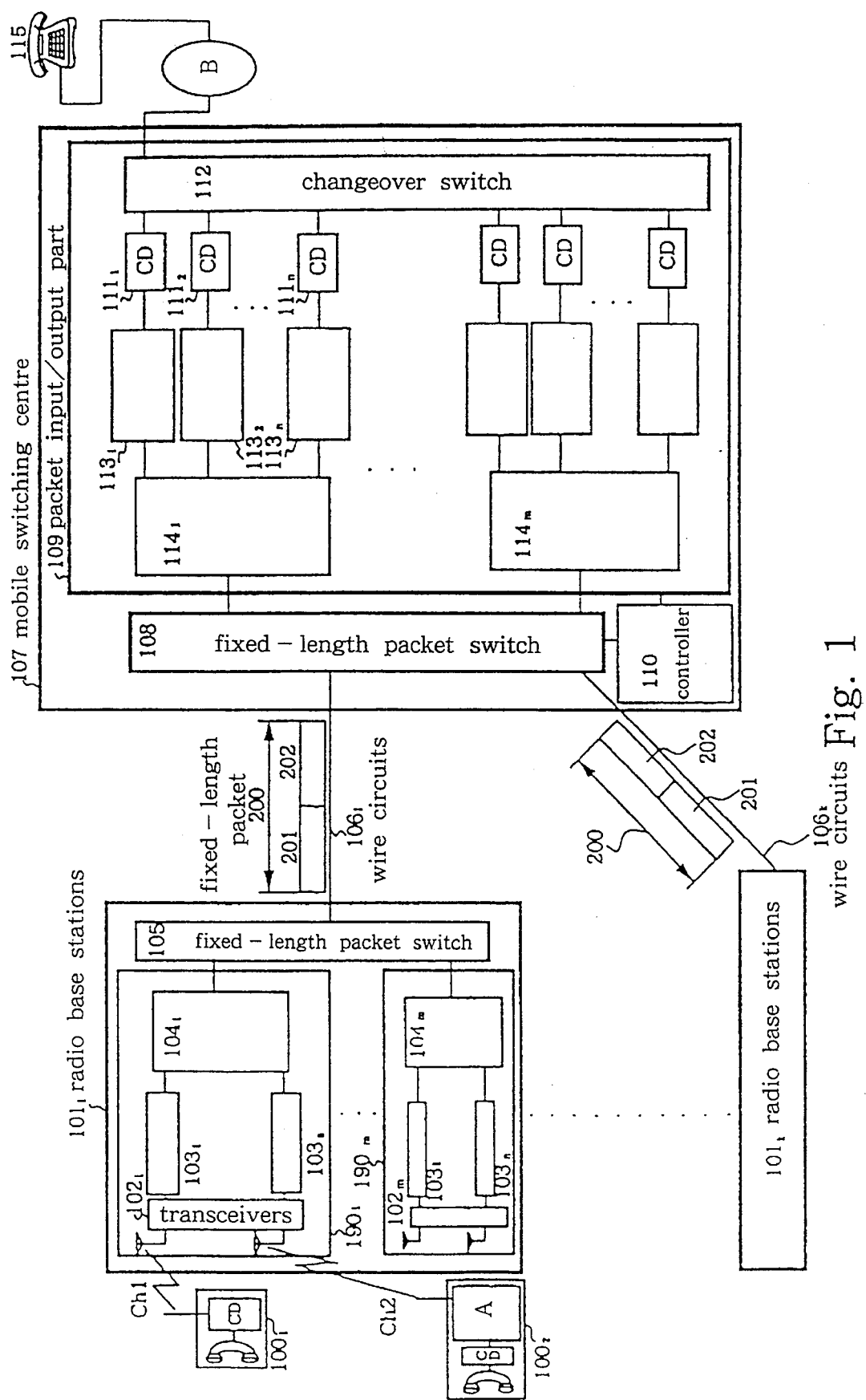
FIG. 1 is a block diagram of a device according to a first embodiment of this invention.

If a fixed-length packet assembly/disassembly circuit $114_1$–$114_m$ within mobile switching center 107 is found which meets this condition, then, as shown in FIGS. 1 and 2(a), an address which will be added to address part 201 of fixed-length packet 200 which is used for this communication will have to be determined so that fixed-length packet 200 will reach the intended mobile switching center 107 or radio base station $101_1$. A plurality of these addresses is provided in a table, and when there is a communication between mobile switching center 107 and radio base station $101_1$, controller 110 refers to the table and searches for an address which is not being used for another communication (S6). If none is found, a busy tone or the like is used to notify telephone set 115 that connection is impossible (S11).

If an address which meets this condition is found, controller 110 determines the address which will be added to fixed-length packet 200 which is used for the communication. It will be assumed here that fixed-length packet assembly/disassembly circuit $114_1$ has been selected. Because all the radio channels paired with information data assembly/disassembly circuits $103_1$–$103_n$ connected to the selected fixed-length packet assembly/disassembly circuit $104_1$ are free, controller 110 selects an arbitrary radio channel. It is assumed here that radio channel $Ch_1$ paired with information data assembly/disassembly circuit $103_1$ has been selected.

Radio base station $101_1$ is notified by controller 110 of (i) the address, (ii) the fixed-length packet assembly/disassembly circuit $104_1$, and (iii) the radio channel $Ch_1$, which will be used in the communication (S7).

In mobile switching center 107, controller 10 selects information data assembly/disassembly circuit $113_1$ of fixed-length packet assembly/disassembly circuit $114_1$, the circuit $113_1$ corresponding to the information data assembly/disassembly circuit $103_1$ used in radio base station $101_1$. Mobile switching center 107 uses changeover switch 112 and fixed-length packet switch 108 to connect code conversion circuit $111_1$, and information data assembly/disassembly circuit $113_1$ in mobile switching center 107 to telephone set 115 and fixed-length packet assembly/disassembly circuit $114_1$ which has been selected for use in the communication. Circuit $113_1$ corresponds to information data assembly/disassembly circuit $103_1$ in radio base station $101_1$, which is connected to a free radio channel. In this way, a communications path is established (S8).

In order to receive fixed-length packet 200, radio base station $101_1$ sets fixed-length packet switch 105 so that, if fixed-length packet 200 with the address notified by controller 110 arrives, the packet switch 105 will switch it to fixed-length packet assembly/disassembly circuit $104_1$ which it has decided to use for the communication. When radio base station $101_1$ transmits a fixed-length packet 200, fixed-length packet assembly/disassembly circuit $104_1$ is notified by adding the notified address to address part 201 of fixed-length packet 200, so that the packet 200 is transmitted to mobile switching center 107.

Radio base station $101_1$ notifies mobile station $100_1$ of the radio channel which it has decided to use for the communication, and sets radio channel $Ch_1$ as the communication path between mobile station $100_1$ and transceiver $102_1$ (S9).

When controller 110 of mobile switching center 107 has discovered that mobile station $100_1$ is in the radio zone of radio base station $101_1$, it looks at fixed-length packet assembly/disassembly circuits 104 which are already being used in other communications, and checks to see whether or not there are, among the radio channels paired with information data assembly/disassembly circuits 103 connected to these circuits 104, radio channels that are not being used in other communications (S1). If it is found that there are radio channels that are not being used, controller 110 checks to see whether or not there are information data assembly/disassembly circuits $113_1$–$113_n$ and code conversion circuits $111_1$–$111_n$ in mobile switching center 107 which are not being used (S2). If there are not, telephone set 115 is notified that connection is impossible (S11). If there are, a communications path is set using information data assembly/disassembly circuits $103_1$–$103_n$ which are connected to free channels at radio base station $101_1$ (S3).

An explanation will be given of the flow of information signals through the communication lines accompanying the operation of these various devices and circuits. First of all information signals from telephone set 115 are subjected to low bit-rate coding by code conversion circuits 111 thereby becoming coded signals that can be transmitted at a low bit rate. These coded signals are then packetized by information data assembly/disassembly circuits 113, each packet having an amount of information that does not result in deterioration of signal quality due to packetizing delay time. These packets correspond to data parts $205_1$–$205_n$ in FIG. 2(a). Control parts $204_1$–$204_n$ are attached to these packets, the control parts containing the control information required to ensure as close a correspondence as possible with the coded signals. Measures that can be taken to obtain a close correspondence include controlling the order in which packets are joined, and replenishing empty packets that result from delay or loss of packets. Addition of these control parts gives information signals 203, which are then sent to fixed-length packet assembly/disassembly circuit $114_1$.

Fixed-length packet assembly/disassembly circuit $114_1$ accommodates a plurality of information signals 203 from information data assembly/disassembly circuits 113 in predetermined positions in fixed-length packet 200. Transmission then takes place after an address, which is specified by controller 110 and which is required for the communication, has been added in address part 201 of fixed-length packet 200.

Fixed-length packet 200 is then switched by fixed-length packet switch 108 in mobile switching center 107 into wire circuit $106_1$ which corresponds to address part 201. Fixed-length packet 200 thus transmitted to radio base station $101_1$ from mobile switching center 107 is then switched to fixed-length packet assembly/disassembly circuit $104_1$ by fixed-length packet switch 105 in radio base station $101_1$, this particular circuit $104_1$ having been specified by controller 110.

Fixed-length packet assembly/disassembly circuit $104_1$ transmits information signal $203_1$ to information data assembly/disassembly circuit $103_1$ which corresponds to the position of information signal $203_1$ in fixed-length packet 200.

Information signal $203_1$ is converted to the original low bit-rate coded signal by information data assembly/disassembly circuit $103_1$ and is transmitted to the corresponding radio channel $Ch_1$. Mobile station $100_1$ receives the coded signal from radio channel $Ch_1$ and restores it to the original information signal by its internal code conversion circuit.

Because the foregoing operations enable a communications route to be established between information data assembly/disassembly circuit $103_1$, which is connected to a radio channel used within radio base station $101_1$, and information data assembly/disassembly circuit $113_1$ within mobile switching center 107, communication between telephone set 115 and mobile station $100_1$ becomes possible.

Suppose that fixed-length packet assembly/disassembly circuits $104_1$–$104_m$ are already being used for other communications. Suppose also that as a result of checking, among radio channels $Ch_1$–$Ch_n$ which are paired with information data assembly/disassembly circuits $103_1$–$103_n$ that are connected to these packet assembly/disassembly circuits, whether there are radio channels $Ch_1$–$Ch_n$ which are not being used for other communications, it is found that there is a radio channel which meets this condition. (It will be assumed here that radio channel $Ch_1$, which corresponds to information data assembly/disassembly circuit $103_1$, meets this condition.) Under these circumstances, controller 110 will send information regarding the radio channel to be used, to radio base station $101_1$ and mobile station $100_1$, by way of control lines and channels which are not shown in FIG. 1, thereby setting the radio channel. At the same time, controller 110 controls changeover switch 112 and thereby connects telephone set 115 to code conversion circuits $111_1$–$111_n$ and information data assembly/disassembly circuits $113_1$–$113_n$ of fixed-length packet assembly/disassembly circuits $114_1$–$114_m$ which correspond to the free radio channel. Thus, because communication paths can be established for mobile station $100_1$ via fixed-length packet assembly/disassembly circuits $104_1$–$104_m$, information data assembly/disassembly circuits $103_1$–$103_n$, and code conversion circuits $111_1$–$111_n$, communication between telephone set 115 and mobile station $100_1$ becomes possible.

Figure 4:
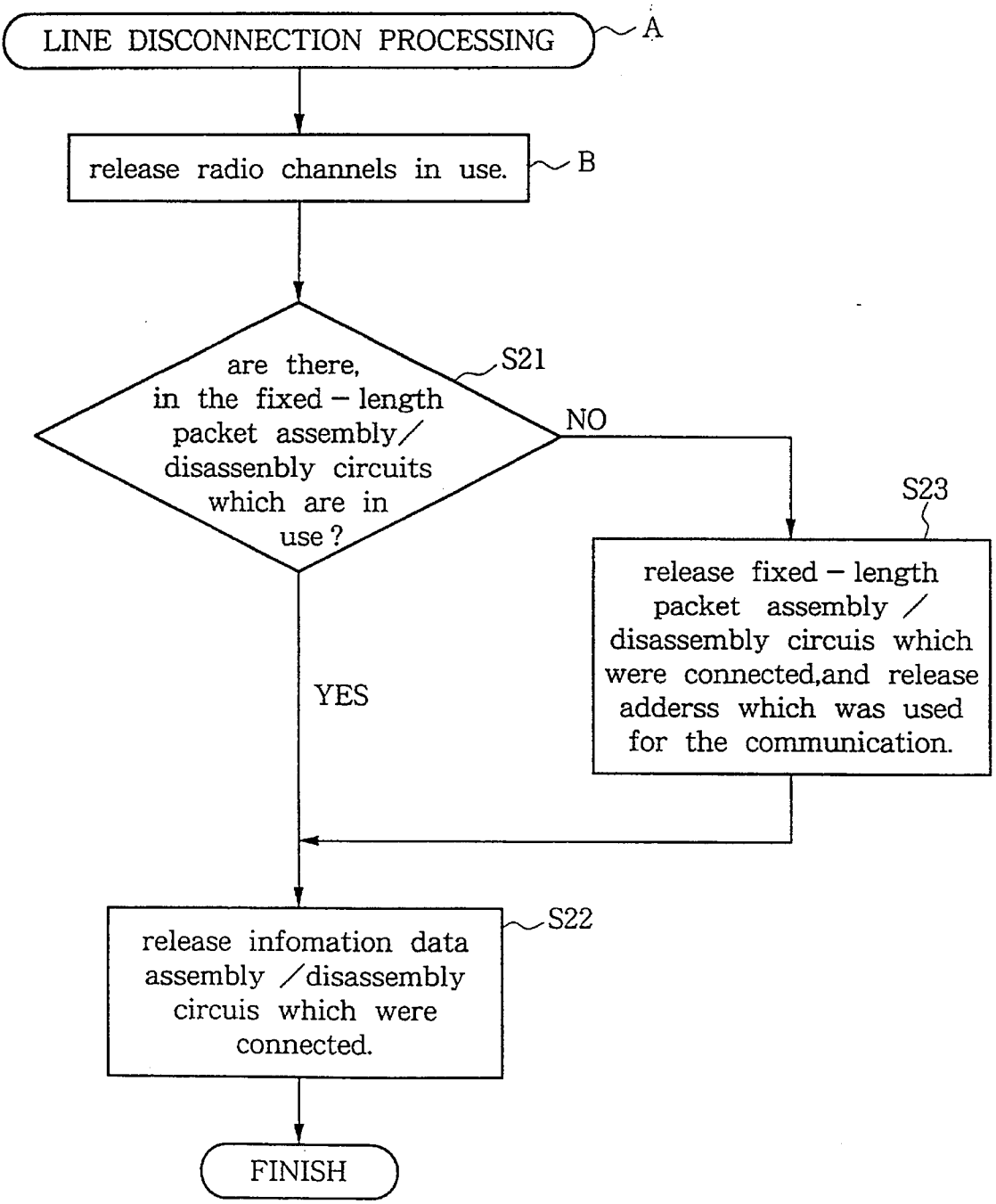
FIG. 4 is a flowchart of the line disconnection processing.

The processing carried out when telephone set 115 and mobile station $100_1$ finish their communication will now be explained with reference to FIG. 4, which is a flowchart of the line disconnection processing. When controller 110 in mobile switching center 107 detects a disconnect signal after telephone set 115 and mobile station $100_1$ have been in communication, the controller 110 checks to see whether, within fixed-length packet assembly/disassembly circuits $104_1$ and $114_1$ which mobile station $100_1$ had been using for communication, there are any information data assembly/disassembly circuits $103_2$–$103_n$ and $113_2$–$113_n$ which are busy with other communications (S21). If there are, then fixed-length packet switches 105 and 108 leave these fixed-length packet assembly/disassembly circuits $104_1$ and $114_1$ connected, since they are in use for other communications. Controller 110 in mobile switching center 107 then controls changeover switch 112 and releases the line between telephone set 115 and information data assembly/disassembly circuit $113_1$, which had corresponded to the radio channel ($Ch_1$). Simultaneously, controller 110 releases radio channel $Ch_1$ which had been in use in radio base station $101_1$, and information data assembly/disassembly circuit $103_1$ which is connected to this (S22).

When there are no information data assembly/disassembly circuits $103_2$–$103_n$ and $113_2$–$113_n$ in use for other communications in fixed-length packet assembly/disassembly circuits $104_1$ and $114_1$ which had been in use (S21), then, because fixed-length packet assembly/disassembly circuits $104_1$ and $114_1$ are now not being used for any communication, line disconnection processing and release processing of fixed-length packet assembly/disassembly circuits $104_1$ and $114_1$ are carried in the following way (S23). Namely, controller 110 releases the address of fixed-length packets 200 which had been used for communication between mobile switching center 107 and radio base station $101_1$, and at the same time notifies fixed-length packet assembly/disassembly circuit $114_1$ in mobile switching center 107 and fixed-length packet assembly/disassembly circuit $104_1$ in radio base station $101_1$ regarding the release of the address, and then releases fixed-length packet assembly/disassembly circuits $104_1$ and $114_1$. The connection between telephone set 115 and information data assembly/disassembly circuit $113_1$ and code conversion circuit $111_1$, these latter having been used for communication within mobile switching center 107, is released by controller 110 by way of control of changeover switch 112. Controller 110 instructs radio base station $101_1$ to release the connection between information data assembly/disassembly circuit $103_1$ and fixed-length packet assembly/disassembly circuit $104_1$, which the radio channel had been using in radio base station $101_1$ (S22). By means of the foregoing operations, the communication link between telephone set 115 and mobile station $100_1$ is disconnected.

It is clear that similar processing can be carried out when, by using mobile station $100_2$ which can deal with information data directly as an information signal, information data assembly/disassembly circuits $103_1$–$103_n$ in radio base station $101_1$ are omitted and short packets are transmitted through the radio channels just as they are (this mode of operation is shown as $Ch_2$ in FIG. 1).

In data section 202 of fixed-length packet 200 shown in FIG. 2(a), information signals $203_1$–$203_n$ have control parts $204_1$–$204_n$ corresponding to the code conversion circuits. However, it is also possible to have a common control part 303 as in FIG. 2(b). This can be achieved by adding and deleting control part 303 to and from each information signal in fixed-length packet assembly/disassembly circuits $104_1$–$104_m$ and $114_1$–$114_m$ when the fixed-length packets are assembled and disassembled. This facilitates communications with even better throughput.

Second embodiment

Figure 5:
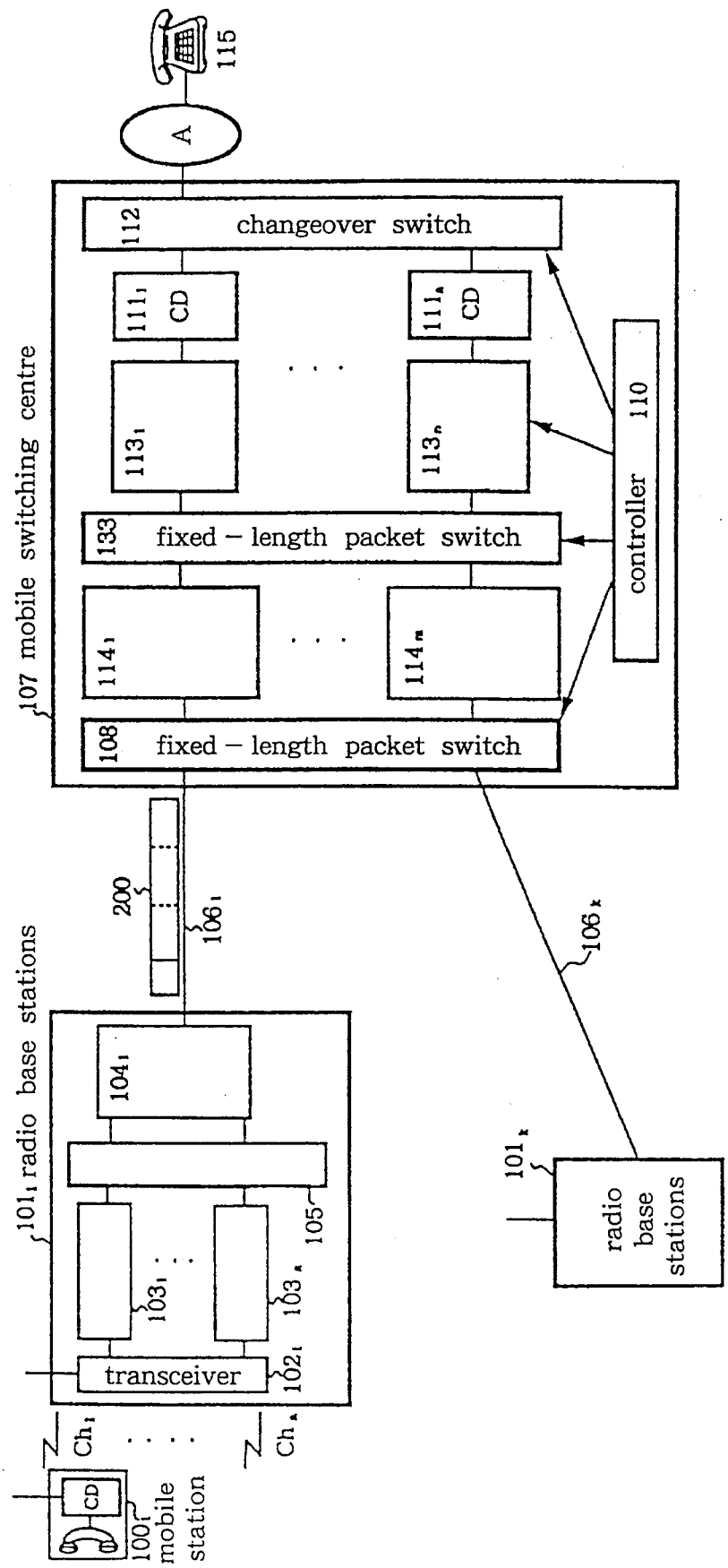
FIG. 5 is a block diagram of a device according to a second embodiment of this invention.
Figure 6:
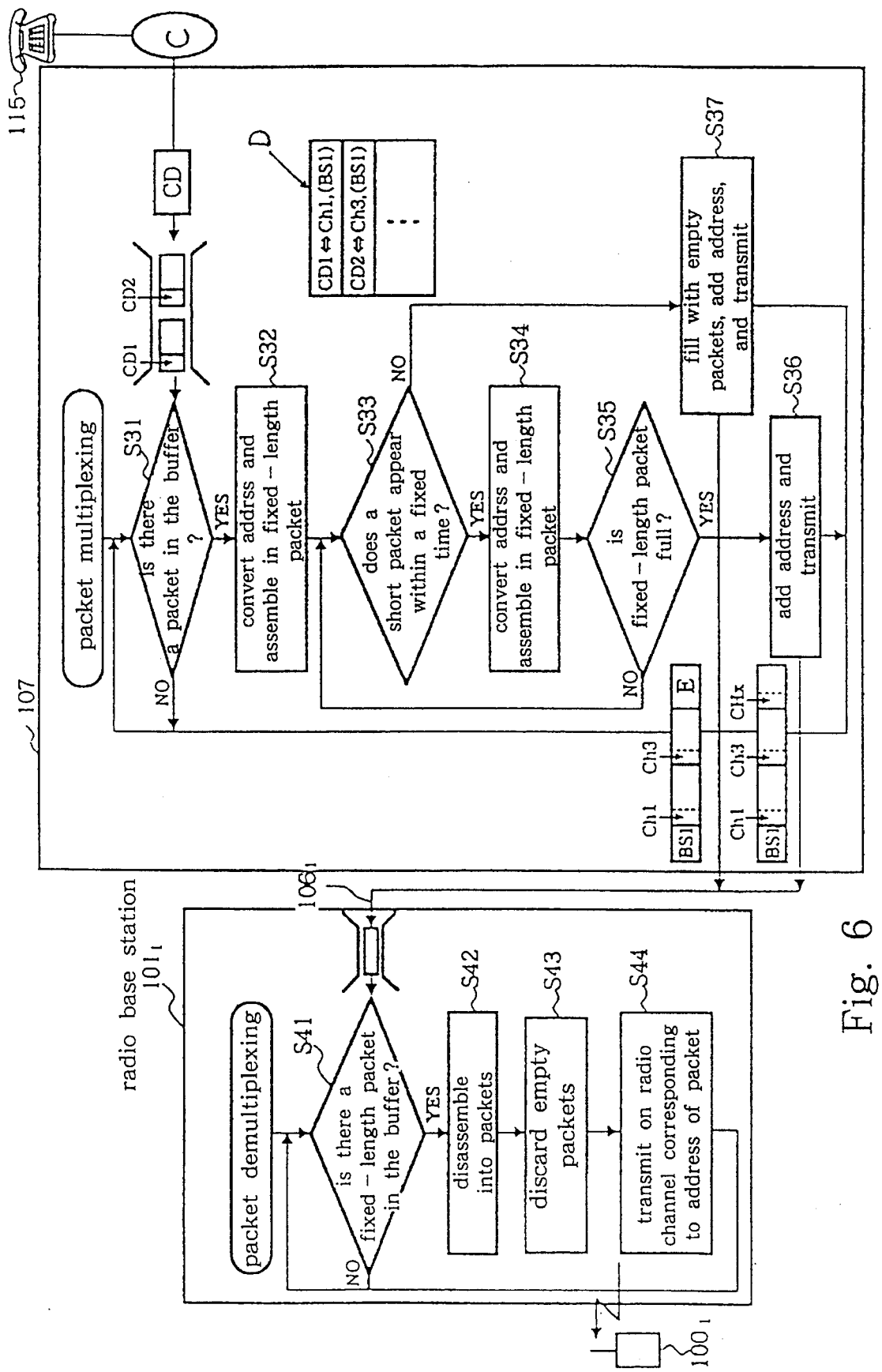
FIG. 6 is a flowchart of the operation of the second embodiment of this invention.

A second embodiment of this invention will now be explained with reference to FIGS. 5 and 6. FIG. 5 is a block diagram of a device according to this second embodiment, while FIG. 6 is a flowchart showing the operation of the second embodiment. In this second embodiment of the invention, second fixed-length packet switch 133 has been interposed between information data assembly/disassembly circuits $113_1$–$113_n$ and fixed-length packet assembly/disassembly circuits $114_1$–$114_m$ in mobile switching center 107, and fixed-length packet switch 105 has been interposed between information data assembly/disassembly circuits $103_1$–$103_n$ and fixed-length packet assembly/disassembly circuit 104 in radio base station $101_1$. This enables information data assembly/disassembly circuits $113_1$–$113_n$ in mobile switching center 107, and information data assembly/disassembly circuits $103_1$–$103_n$ and fixed-length packet assembly/disassembly circuits $104_1$–$104_m$ in radio base station $101_1$, to be respectively simplified in comparison with the first embodiment of this invention illustrated in FIG. 1.

In other words, by using fixed-length packet switch 133 to switch information data assembly/disassembly circuits $113_1$–$113_n$ and fixed-length packet assembly/disassembly circuits $114_1$–$114_m$ in mobile switching center 107, so that any given information data assembly/disassembly circuit $113_1, 113_2, \ldots, 113_n$ can be connected at will to any given fixed-length packet assembly/disassembly circuit $114_1, 114_2, \ldots, 114_m$, the same operation as in the first embodiment of this invention can be achieved when there is a group of information data assembly/disassembly circuits $113_1$–$113_n$ for fixed-length packet assembly/disassembly circuits $114_1$–$114_m$.

In radio base station $101_1$, by having just a single fixed-length packet assembly/disassembly circuit 104, and by interposing fixed-length packet switch 105 between this fixed-length packet assembly/disassembly circuit 104 and information data assembly/disassembly circuits $103_1$–$103_n$, fixed-length packet switch 105 is used to switch a plurality of information data assembly/disassembly circuits $103_1$–$103_n$ and a single fixed-length packet assembly/disassembly circuit 104. This enables the same operation as in the first embodiment of this invention to be achieved when there is a single fixed-length packet assembly/disassembly circuit 104 for a group of information data assembly/disassembly circuits $103_1$–$103_n$.

Figure 10:
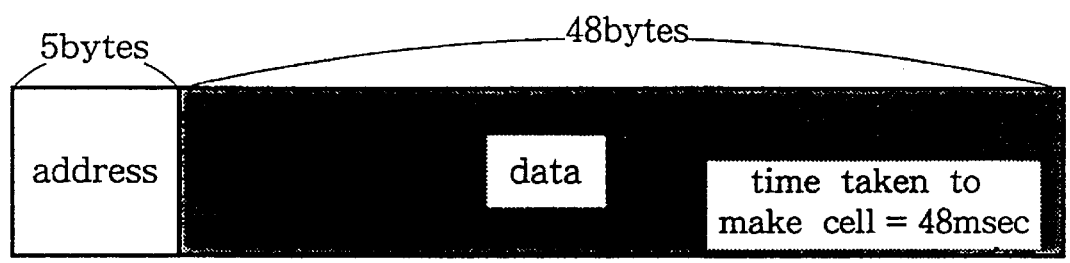
FIGS. 10(a) and 10(b) shows the constitution of signals used in ATM transmission.
Figure 10:
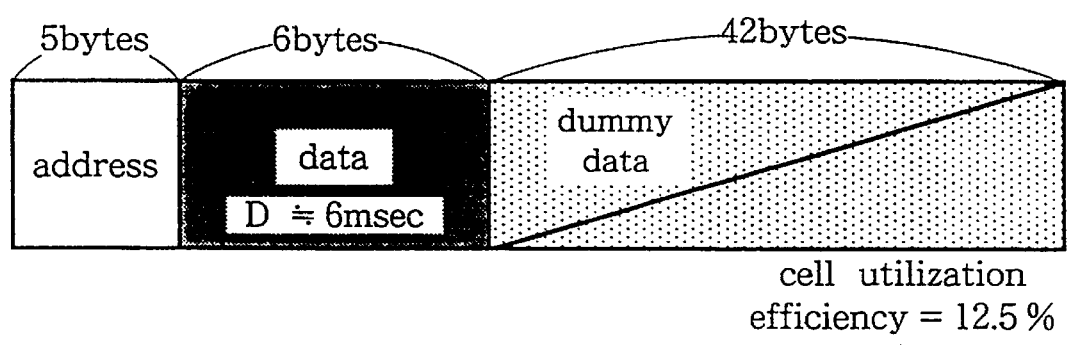

The low bit-rate packets assembled by information data assembly/disassembly circuits $103_1$–$103_n$ and $113_1$–$113_n$ are given the same form as the fixed-length packets 200 assembled by fixed-length packet assembly/disassembly circuits 104 and $114_1$–$114_m$. In other words, the low bit-rate packets use only part of a fixed-length packet 200, with the remainder being filled with dummy information which is discarded in fixed-length packet assembly/disassembly circuits 104 and $114_1$–$114_m$. Although this is the same as fixed-length packet 200 shown in FIG. 10(b) as prior art, because it takes place within the device, there is no increase in transmission lines. This enables all three fixed-length packet switches 105, 108 and 133 to be implemented using the same hardware configuration.

It is assumed that the combinations of information data assembly/disassembly circuits $103_1$–$103_n$, fixed-length packet assembly/disassembly circuits $114_1$–$114_m$, information data assembly/disassembly circuits $113_1$–$113_n$ and code conversion circuits $111_1$–$111_n$ which are used between mobile switching center 107 and radio base stations $101_1$–$101_k$, and the addresses of the fixed-length packets 200 which are transmitted and received, are indicated in advance to controller 110 by commands. Controller 110 presets fixed-length packet switch 108 so that fixed-length packets 200 are switched by means of their address to corresponding wire circuits $106_1$–$106_k$ and fixed-length packet assembly/disassembly circuits $114_1$–$114_m$. It is assumed here that when radio base station $101_1$ is used, it will be specified that fixed-length packet assembly/disassembly circuit $114_1$ is used. The explanation also assumes that mobile station $100_1$ is moving within the radio zone controlled by radio base station $101_1$. When controller 110 of mobile switching center 107 has detected a call from telephone set 115 to mobile station $100_1$, it issues a general call and discovers that mobile station $100_1$ is in the radio zone of radio base station $101_1$. This is the same as in a conventional system.

When controller 110 has discovered that mobile station $100_1$ is in the radio zone of radio base station $101_1$, it looks for free radio channels $Ch_1$–$Ch_n$ which are not being used by radio base station $101_1$. It will be assumed here that radio channel $Ch_1$ has been selected. If there are no free radio channels $Ch_1$–$Ch_n$, no connection can be made and a busy tone is used to inform telephone set 115 of this.

When controller 110 has found a free radio channel $Ch_1$, it looks for pairs of code conversion circuits $111_1$–$111_n$ and information data assembly/disassembly circuits $113_1$–$113_n$ which are not in use. It will be assumed here that it has selected code conversion circuit $111_1$ and information data assembly/disassembly circuit $113_1$. If there was no code conversion circuit 111 and information data assembly/disassembly circuit 113 pair which was free, connection is impossible, and a busy tone is used to notify telephone set 115 of this.

Controller 110 identifies fixed-length packet assembly/disassembly circuit $114_1$ which is to be used in correspondence with predetermined radio base station $101_1$. Controller 110 then gives this identified fixed-length packet assembly/disassembly circuit $114_1$ (i) information which identifies the information data assembly/disassembly circuit $113_1$ and code conversion circuit $111_1$ pair to be used for this communication, and (ii) information regarding radio channel $Ch_1$ which is to be used. Fixed-length packet assembly/disassembly circuit $114_1$ stores this information and uses it for conversion of the address information of the voice packets (to be described below).

Controller 110 informs radio base station $101_1$ of radio channel $Ch_1$ which has been selected for use in the communication, and requests that radio channel $Ch_1$ be set between radio base station $101_1$ and mobile station $100_1$. Radio base station $101_1$ uses transceiver $102_1$ to set radio channel $Ch_1$ between itself and mobile station $100_1$.

Controller 110 connects information data assembly/disassembly circuit $113_1$ and fixed-length packet assembly/disassembly circuit $114_1$ to telephone set 115 and code conversion circuit $111_1$ by controlling changeover switch 112 and fixed-length packet switch 133. Fixed-length packet assembly/disassembly circuit 104 of radio base station $101_1$ and fixed-length packet assembly/disassembly circuit $114_1$ of mobile switching center 107 are preset as already described. In addition, the data transfer rate between telephone set 115 and mobile station $100_1$ can be preset.

Data transfer in this second embodiment of the invention will now be explained with reference to FIG. 6. An explanation will be given first of all of data transfer from telephone set 115 to mobile station $100_1$. Code conversion circuit $111_1$ converts voice signals from telephone set 115 to low bit-rate voice signals by means of low bit-rate coding. Information data assembly/disassembly circuit $113_1$ assembles the low bit-rate voice signals into short packets and outputs these as voice packets after adding (i) control information for use in the correction, etc., of packet loss, and (ii) address information which makes it possible to identify code conversion circuit $111_1$ (for example, a series of numbers is assigned in advance to code conversion circuits $111_1$–$111_n$ in mobile switching center 107).

The output voice packets are switched by fixed-length packet switch 133 and transferred to fixed-length packet assembly/disassembly circuit $114_1$ which has been preset by controller 110 on the basis of address information.

Fixed-length packet assembly/disassembly circuit $114_1$ buffers the voice packets that have been sent from a plurality of information data assembly/disassembly circuits $113_1$–$113_n$ which have been connected by means of fixed-length packet switch 133. Fixed-length packet assembly/disassembly circuit $114_1$ constantly monitors whether or not there is a voice packet in the buffer (S31). When a voice packet has been stored in the buffer, it is taken out of the buffer and assembled in fixed-length packet 200 after the number of code conversion circuit $111_1$ has been converted to the number of radio channel $Ch_1$ in accordance with pre-stored radio channel numbers and code conversion circuit numbers which have been indicated beforehand by controller 110 (S32). Fixed-length packet assembly/disassembly circuit $114_1$ then monitors for a prearranged time whether there is a voice packet in the buffer (S33).

If a voice packet arrives within the set time, it is taken from the buffer, the address of the voice packet converted in the manner described above, and the packet is assembled in fixed-length packet 200 (S34). These operations are repeated until a prearranged number of voice packets have been received and fixed-length packet 200 has been assembled (S35). After assembly of fixed-length packet 200 has been completed, address information for pre-assigned radio base station $101_1$ is added and the packet is transmitted (S36).

If no voice packet arrives in the course of monitoring for the prearranged time, fixed-length packet 200 is assembled by being filled with an empty packet which serves as dummy information: for example, the empty packet can have its address part 201 set to "0". It is then transmitted after the addition of address information indicating the pre-assigned radio base station $101_1$ (S37). The fixed-length packet 200 is transmitted by fixed-length packet switch 108 via wire circuit $106_1$ to radio base station $101_1$, which corresponds to the address information.

When radio base station $101_1$ has received fixed-length packet 200 from mobile switching center 107, fixed-length packet assembly/disassembly circuit 104 detects if fixed-length packet 200 is stored in its internal buffer (S41) and disassembles it into packets (S42). At this point in time, empty packets are unwanted and are therefore discarded (S43). Loss or transmission delay of a voice packet is corrected by information data assembly/disassembly circuit $103_1$ which is connected in correspondence with radio channel $Ch_1$ which in turn corresponds to the address, and the original low bit-rate voice signal is recovered and transmitted on radio channel $Ch_1$ (S44). Mobile terminal $100_1$ receives the low bit-rate voice signal on radio channel $Ch_1$, carries out code conversion, and recovers the voice signal.

An explanation will now be given of data transfer from mobile station $100_1$ to telephone set 115. Voice signals received at mobile station $100_1$ are code-converted and sent by radio channel $Ch_1$ to radio base station $101_1$ as coded low bit-rate voice signals. A low bit-rate voice signal on radio channel $Ch_1$ which has been received by transceiver $102_1$ of radio base station $101_1$ is converted to a voice packet by information data assembly/disassembly circuit $103_1$, which corresponds to radio channel $Ch_1$. The address part of this voice packet is given information which identifies radio channel $Ch_1$. The voice packet is sent to fixed-length packet assembly/disassembly circuit 104, where it is assembled into fixed-length packet 200 by the same processing as in fixed-length packet assembly/disassembly circuit $114_1$ of mobile switching center 107 shown in FIG. 6, and transmitted to wire circuit $106_1$. In radio base station $101_1$, the address of a voice packet is sent as it is.

When fixed-length packet assembly/disassembly circuit $114_1$ of mobile switching center 107 receives fixed-length packet 200 from radio base station $101_1$, it disassembles the fixed-length packet 200 into voice packets by means of the same processing as fixed-length packet assembly/disassembly circuit 104 of radio base station $101_1$ shown in FIG. 6. The addresses of these voice packets are then converted to addresses which identify code conversion circuit $111_1$, which has been preset by controller 110, whereupon the voice packets are transmitted. At this point in time, empty packets which indicate dummy information are discarded. Fixed-length packet switch 133 sends the voice packets to information data assembly/disassembly circuit $113_1$ and code conversion circuit $111_1$, which correspond to the converted address, whereupon the voice packet is converted to the original voice signal and sent to telephone set 115.

In this second embodiment of the invention, fixed-length packet assembly/disassembly circuits $114_1$–$114_m$ were provided in correspondence with radio base stations $101_1$–$101_k$. However, the following constitution is also possible. Namely, when setting the travel path of packets, controller 110 may notify fixed-length packet assembly/disassembly circuit $114_1$ simultaneously of information which identifies (i) the information data assembly/disassembly circuit $113_1$ and code conversion circuit $111_1$ pair to be used for a given communication, (ii) the radio channel $Ch_1$ to be used for the communication, and (iii) radio base station $101_1$ (i.e., the address of fixed-length packet 200 which is being used in radio base station $101_1$). A plurality of radio base stations $101_1$–$101_k$ will then be multiprocessed by a single fixed-length packet assembly/disassembly circuit $114_1$ by assembling fixed-length packets in correspondence with radio base station $101_1$.

Although code conversion circuits $111_1$–$111_n$ and information data assembly/disassembly circuits $113_1$–$113_n$ have been explained as separate circuits, an explanation could likewise be given of speech being directly converted to and output as packets in the course of the low bit-rate coding.

Although the explanation has been given in terms of a single address for fixed-length packet 200 used between mobile switching center 107 and radio base station $101_1$, the same connection processing could also be carried out using a plurality of addresses, so that radio channel $Ch_1$ was identified by a combination of (i) an address for fixed-length packet 200, and (ii) addresses for the low bit-rate information packets which are accommodated in fixed-length packet 200.

In this second embodiment of the invention, radio channels $Ch_1$–$Ch_n$ were assumed to be circuit switched, and therefore information data assembly/disassembly circuits $103_1$–$103_n$ were installed in radio base station $101_1$, and low bit-rate packets were restored to the original signals and transferred by means of radio channels $Ch_1$–$Ch_n$. Of course, if radio channels $Ch_1$–$Ch_n$ were packet channels that transferred packets, it would also be possible to constitute the invention with information data assembly/disassembly circuits $103_1$–$103_n$ installed, not in radio base station $101_1$, but in mobile stations $100_1$–$100_k$, so that transfer of data would be carried out in similar fashion by transferring low bit-rate signals to mobile stations $100_1$–$100_k$ in the form of packets.

Third embodiment

Figure 7:
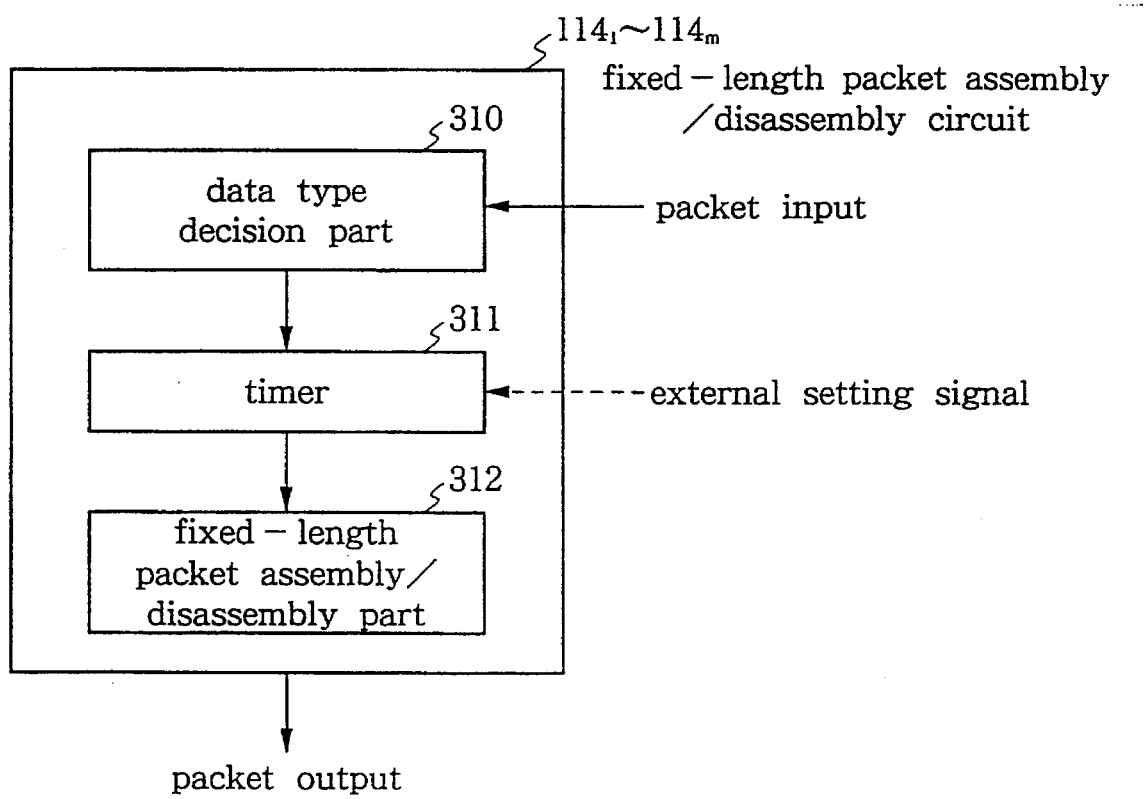
FIG. 7 is a block diagram of a fixed-length packet assembly/disassembly circuit according to a third embodiment of this invention.
Figure 8:
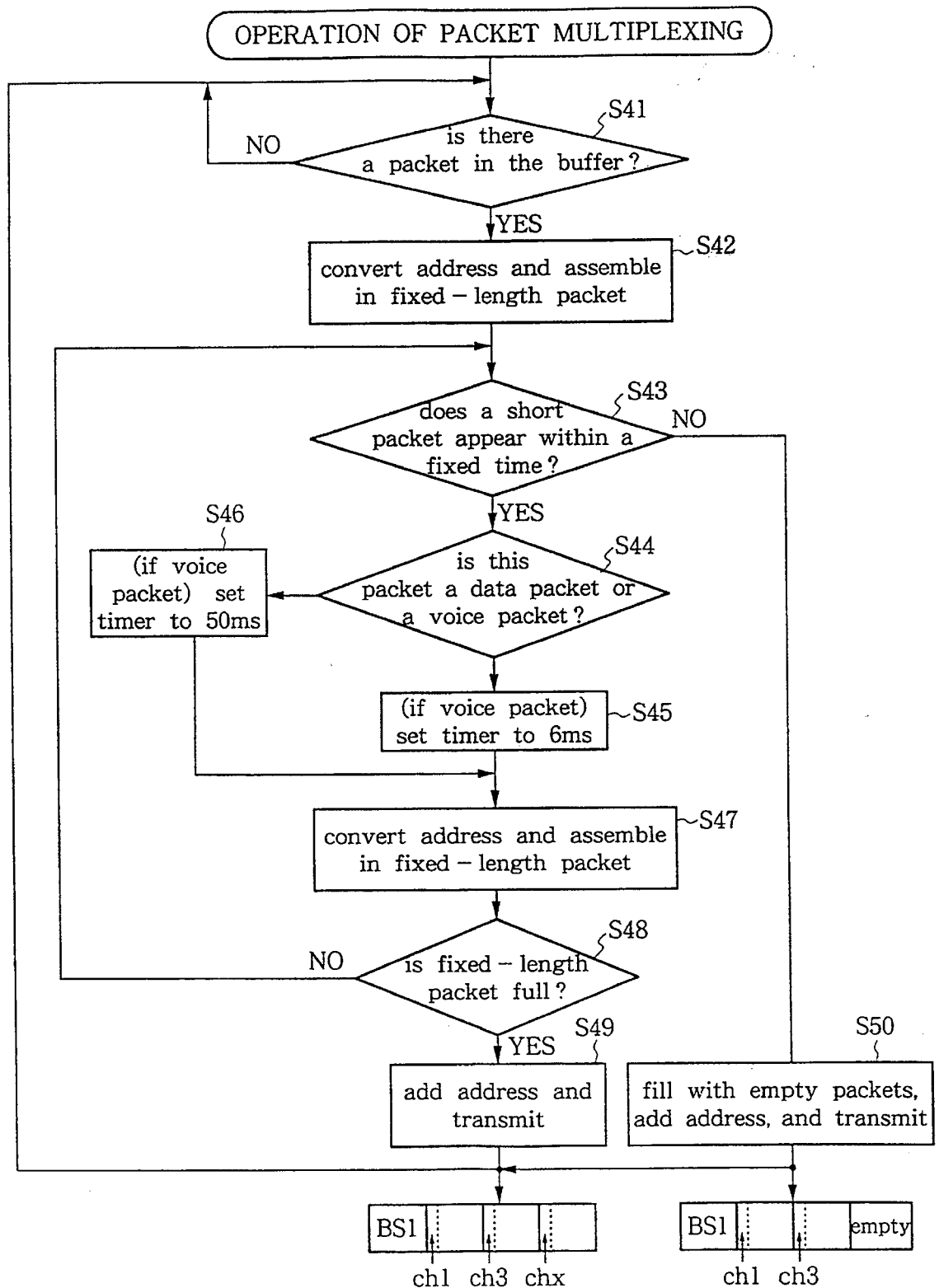
FIG. 8 is a flowchart of the operation of the third embodiment of this invention.

A third embodiment of this invention will now be explained with reference to FIGS. 7 and 8. FIG. 7 is a block diagram of fixed-length packet assembly/disassembly circuits $104_1$–$104_m$ and $114_1$–$114_m$, in this third embodiment. The following explanation will focus on fixed-length packet assembly/disassembly circuit $114_1$. FIG. 8 is a flowchart of the operation of this third embodiment of the invention. Fixed-length packet assembly/disassembly circuit $114_1$ according to this third embodiment is provided with data type decision part 310 and timer 311. Fixed-length packet assembly/disassembly part 312 operates in similar manner to fixed-length packet assembly/disassembly circuit $104_1$ in the first and second embodiments of this invention.

Data type decision part 310 decides whether or not the data contained in a short packet which arrives is voice data. The preset time in timer 311 is changed in accordance with the result of the decision by data type decision part 310. The preset time in timer 311 can also be changed by an external setting signal. For example, if a voice packet is transmitted with a delay on a par with the 6 ms delay involved in making a cell when a 64 kbps voice signal is inserted in an ATM cell, the timer will be set to 6 ms. When a data packet is transmitted instead of a voice packet, the timer is set to the delay allowed by the data service, for example, 50 ms.

The operation of this third embodiment of the invention will be explained with reference to FIG. 8. Fixed-length packet assembly/disassembly circuit $114_1$ constantly monitors whether or not there is a short packet in the buffer (S41). When a short packet has been stored in the buffer, it is taken out of the buffer and the number of code conversion circuit $111_1$ is converted to the number of radio channel $Ch_1$ in accordance with radio channel numbers and code conversion circuit numbers which have been stored in advance and which are indicated by controller 110. The short packet is then assembled in a fixed-length packet 200 (S42). Fixed-length packet assembly/disassembly circuit $114_1$ subsequently monitors, for a prearranged time interval, whether there is a short packet in the buffer (S43).

At this point in time, data type decision part 310 decides the data type of the short packet which has arrived in the buffer. In other words, it decides whether the packet is a voice packet or a non-voice data packet (S44). If it is a voice packet, the preset time of timer 311 is set to 6 ms (S45). If it is a data packet, the preset time of timer 311 is set to 50 ms (S46). It is also feasible to set the preset time of timer 311 by means of an external setting signal, irrespective of the result of the decision by data type decision part 310. If a short packet has arrived within a time which has been set in one of these ways, it is taken out of the buffer, its address converted in the manner described above, and the short packet assembled into a fixed-length packet 200 (S47). This operation is repeated until a prearranged number of short packets have been received and a fixed-length packet 200 has been assembled (S48). If the assembling of fixed-length packet 200 has been completed, prespecified address information for radio base station $101_1$ is added and the packet is transmitted (S49).

If no short packets arrive during monitoring for the prearranged time, fixed-length packet 200 is assembled by being filled with empty packets which serve as dummy information: for example, empty packets can have their address parts 201 set to "0". It is then transmitted after the addition of address information indicating the pre-assigned radio base station $101_1$ (S50). The fixed-length packet 200 is transmitted by fixed-length packet switch 108 via wire circuit $106_1$ to radio base station $101_1$, which corresponds to the address information. This operation is carried out in a similar manner in both radio base station 101 and mobile switching center 107.

What is claimed is:

1. A mobile radio communications system comprising:

a plurality of mobile stations, a plurality of radio base stations connected to the plurality of mobile stations by radio channels, and a mobile switching center connected to the plurality of radio base stations by wire circuits, the mobile switching center and the plurality of radio base stations having means for transmitting and receiving fixed-length packets through the wire circuits;

the fixed-length packets having a signal length which accommodates a plurality of short packets;

the means for transmitting and receiving comprising:

(A) information data assembly/disassembly circuits comprising:
  (i) a plurality of assembling means to which are input low bit-rate digital information signals, and for assembling short packets; and
  (ii) a plurality of disassembling means to which are input short packets, and for disassembling the input short packets into low bit-rate digital information signals; the plurality of assembling and disassembling means provided in parallel in correspondence with the information signal channels; and (B) fixed-length packet assembly/disassembly circuits comprising:
  (iii) means for accommodating the short packets output from the assembling means in the fixed-length packets in positions corresponding to the channels, and for transmitting the short packets to the wire circuits; and (iv) means for extracting and disassembling the short packets accommodated in channel-corresponding positions in the fixed-length packets which arrive from the wire circuits, and for transferring the short packets to channels corresponding to the positions in which they were accommodated.

2. A mobile radio communications system as set forth in claim 1, wherein the transmitting and receiving means of the mobile switching center comprises:

a first fixed-length packet switch provided between the wire circuits and fixed-length packet assembly/disassembly circuits; and a second fixed-length packet switch provided between the fixed-length packet assembly/disassembly circuits and the information data assembly/disassembly circuits.

3. A mobile radio communications system as set forth in claim 1, wherein the transmitting and receiving means of the radio base station comprises:

a fixed-length packet switch provided between a fixed-length packet assembly/disassembly circuit connected to the wire circuit, and the information data assembly/disassembly circuits.

4. A mobile radio communications system as set forth in claim 1, wherein the transmitting means comprises:

a timer;

means for forming the fixed-length packets at time intervals preset in the timer; and means for inserting dummy packets into an empty portion of the fixed-length packet when the preset time interval has elapsed and there is spare capacity in the fixed-length packet.

5. A mobile radio communications system as set forth in claim 4, further comprising:

means for discriminating a type of data contained in the short packets, and means for changing the preset time of the timer in accordance with the type of data discriminated by the means for discriminating.

6. A mobile radio communications system as set forth in claim 5, wherein the types of data include voice data and non-voice data, and wherein the preset time is short for voice data.

7. A mobile radio communications system as set forth in claim 4, wherein the timer comprises means for changing the preset time by an external signal.

8. A mobile radio communications system as set forth in claim 1, wherein the short packets comprise control parts and data parts, and wherein a plurality of data parts share a single control part.

* * * * *